US 8,919,574 B2

(12) United States Patent
Wu

(10) Patent No.: US 8,919,574 B2
(45) Date of Patent: Dec. 30, 2014

(54) WATER PURIFIER

(76) Inventor: Jung-Kuei Wu, Hsinchu (TW)

(*) Notice: Subject to any disclaimer, the term of this patent is extended or adjusted under 35 U.S.C. 154(b) by 355 days.

(21) Appl. No.: 13/584,665

(22) Filed: Aug. 13, 2012

(65) Prior Publication Data

US 2013/0056410 A1    Mar. 7, 2013

(30) Foreign Application Priority Data

Sep. 1, 2011    (TW) .............................. 100216349 U

(51) Int. Cl.
| | |
|---|---|
| C02F 1/00 | (2006.01) |
| B01D 21/00 | (2006.01) |
| B01D 21/02 | (2006.01) |
| B01D 21/26 | (2006.01) |

(52) U.S. Cl.
CPC ................ B01D 21/02 (2013.01); C02F 1/006 (2013.01); B01D 21/0042 (2013.01); B01D 21/267 (2013.01); C02F 2001/007 (2013.01); C02F 2301/026 (2013.01)
USPC ......... 210/512.1; 210/540; 210/788; 209/727

(58) Field of Classification Search
USPC ........................ 210/512.1, 540, 788; 209/727
See application file for complete search history.

(56) References Cited

U.S. PATENT DOCUMENTS 6,143,175 A * 11/2000 Ford et al. .................. 210/512.1
8,678,204 B2 * 3/2014 Ford ........................... 210/512.1

* cited by examiner

*Primary Examiner* — David A Reifsnyder
(74) *Attorney, Agent, or Firm* — Blakely Sokoloff Taylor & Zafman

(57) ABSTRACT

A water purifier includes an outer tube having a partition wall dividing the outer tube into lower and upper storage chambers, an intermediate tube defining a guide receiving space and a plurality of angularly spaced-apart inclined through holes to fluidly communicate the guide receiving space and the upper storage chamber, and an inner tube defining a water-exit passage and a plurality of angularly spaced-apart inclined guide holes to fluidly communicate the guide receiving space and the water-exit passage. A guide unit includes a plurality of flow guide plates disposed at positions corresponding to the inclined through holes.

8 Claims, 4 Drawing Sheets

WATER PURIFIER

CROSS-REFERENCE TO RELATED APPLICATION

This application claims priority to Taiwanese Patent Application No. 100216349, filed on Sep. 1, 2011.

BACKGROUND OF THE INVENTION

1. Field of the Invention

The invention relates to a purification device, more particularly to a water purifier.

2. Description of the Related Art

Referring to FIG. 1, a conventional water purifier includes an outer tube 11, an intermediate tube 12, an inner tube 13 and a water circulation unit 14.

The outer tube 11 defines an upper storage chamber 111, and a lower storage chamber 112 opposite to the upper storage chamber 111. The intermediate tube 12 is disposed in the outer tube 11 and includes an intermediate surrounding wall 121 that defines a guide receiving space 122, and a plurality of angularly spaced-apart horizontal through holes 123 to fluidly communicate the upper storage chamber 111 and the guide receiving space 122.

The inner tube 13 is disposed in the intermediate tube 12 and includes an inner surrounding wall 131 that defines a water-exit passage 130. The inner surrounding wall 131 includes a water-exit section 132 extending through the outer tube 11, a connecting section 133 located within the upper storage chamber 111, and a water collecting section 134 located within the lower storage chamber 112 without extending beyond the intermediate tube 12. The water collecting section 134 has a plurality of angularly spaced-apart horizontal guide holes 135 (only one is shown) to fluidly communicate the guide receiving space 122 and the water-exit passage 130.

The water circulation unit 14 includes a water inlet pipe 141 disposed on an outer surrounding wall of the outer tube 11 and communicating fluidly with the upper storage chamber 111, an upper water drain pipe 142 disposed on the outer surrounding wall of the outer tube 11 spaced apart from the water inlet pipe 14 and communicating fluidly with the upper storage chamber 111, and a lower water drain pipe 143 disposed on the outer surrounding wall of the outer tube 11 and communicating fluidly with the lower storage chamber 112. Viewing from a radial direction of the outer tube 11, projections of the water inlet pipe 141 and the intermediate tube 12 do not overlap.

In use, liquid water having a large amount of sediments and suspended particles is introduced into the upper storage chamber 111 of the outer tube 11 through the water inlet pipe 141. The liquid water can swirl about the intermediate tube 12 since the projections of the water inlet pipe 141 and the intermediate tube 12 do not overlap. During swirling, large particle size sediments of the liquid water are thrown against the outer surrounding wall of the outer tube 11 by centrifugal force and are discharged through the upper water drain pipe 142. Liquid water that is closer to the intermediate tube 12 flows into the lower storage chamber 112 through the through holes 123. More sediments can be discharged from the lower storage chamber 112 by operating the lower water drain pipe 143. As the liquid water is accumulated in the lower storage chamber 112 to a height that covers a bottom opening of the guide receiving space 122, the lower storage chamber 112 becomes airtight. Compressed air inside the lower storage chamber 112 forces the liquid water to flow through the water-exit passage 130 and move upwardly along the inner tube 13. Hence, purified liquid water can be collected from the water-exit section 132.

However, because the through holes 123 in the intermediate tube 12 are horizontal, when the liquid water swirls in the upper storage chamber 111, the flow of the liquid water through the through holes 123 can be easily discontinued, thereby affecting the efficiency of throwing off the sediments and achieving the purifying effect.

SUMMARY OF THE INVENTION

Therefore, an object of the present invention is to provide a water purifier that can enhance water purification efficiency.

According to the present invention, a water purifier includes an outer tube, an intermediate tube, an inner tube, a water circulation unit and a guide unit.

The outer tube includes a bottom wall, an outer surrounding wall extending upwardly from the bottom wall, a top wall covering the outer surrounding wall, and a partition wall connected to the outer surrounding wall and disposed between the top and bottom walls to divide the outer tube into a lower storage chamber and an upper storage chamber.

The intermediate tube is disposed in the outer tube and includes an intermediate surrounding wall that extends downwardly from the top wall of the outer tube and that defines a guide receiving space. The intermediate surrounding wall includes a flow guide section disposed in the upper storage chamber, and an extension section disposed in the lower storage chamber. The flow guide section has a plurality of angularly spaced-apart inclined through holes to fluidly communicate the guide receiving space and the upper storage chamber.

The inner tube is disposed in the intermediate tube and includes an inner surrounding wall that defines a water-exit passage. The inner surrounding wall includes a water-exit section extending through the top wall of the outer tube, a liquid collecting section disposed in the extension section of the intermediate surrounding wall without extending beyond the extension section, and a connecting section connected between the water-exit section and the liquid collecting section and disposed in the flow guide section of the intermediate surrounding wall. The liquid collecting section has a plurality of angularly spaced-apart inclined guide holes to fluidly communicate the guide receiving space and the water-exit passage.

The water circulation unit includes a water inlet pipe disposed on the outer surrounding wall and communicates fluidly with the upper storage chamber, at least one upper water drain pipe is disposed on the outer surrounding wall spaced apart from the water inlet pipe and communicates fluidly with the upper storage chamber, and at least one lower water drain pipe disposed on the outer surrounding wall and communicates fluidly with the lower storage chamber.

The guide unit includes a plurality of flow guide plates disposed on the intermediate surrounding wall at positions corresponding to the inclined through holes in the flow guide section.

Preferably, each of the flow guide plates has a height that increases gradually, upwardly and inclinedly around the intermediate surrounding wall.

Preferably, each of the inclined through holes in the intermediate surrounding wall is inclined at an angle of 35° to 80° relative to a horizontal surface.

Preferably, each of the inclined guide holes in the inner surrounding wall is inclined at an angle of 35° to 80° relative to a horizontal surface.

Preferably, a sum of cross sectional areas of the inclined through holes in the intermediate tube is smaller than a cross sectional area of the water inlet pipe.

Preferably, a sum of cross sectional areas of the inclined guide holes in the inner tube is smaller than a cross sectional area of the intermediate tube.

Preferably, a direction of water inflow in the water inlet pipe is substantially perpendicular to a direction of water outflow in the upper water drain pipe.

Preferably, the water circulation unit includes two the upper water drain pipes, and further includes a discharge pipe disposed on the bottom wall of the outer tube and communicating fluidly with the lower storage chamber.

BRIEF DESCRIPTION OF THE DRAWINGS

Other features and advantages of the present invention will become apparent in the following detailed description of the preferred embodiment (please remember to check this part) with reference to the accompanying drawings, of which.

DETAILED DESCRIPTION OF THE PREFERRED EMBODIMENT

Figure 1:
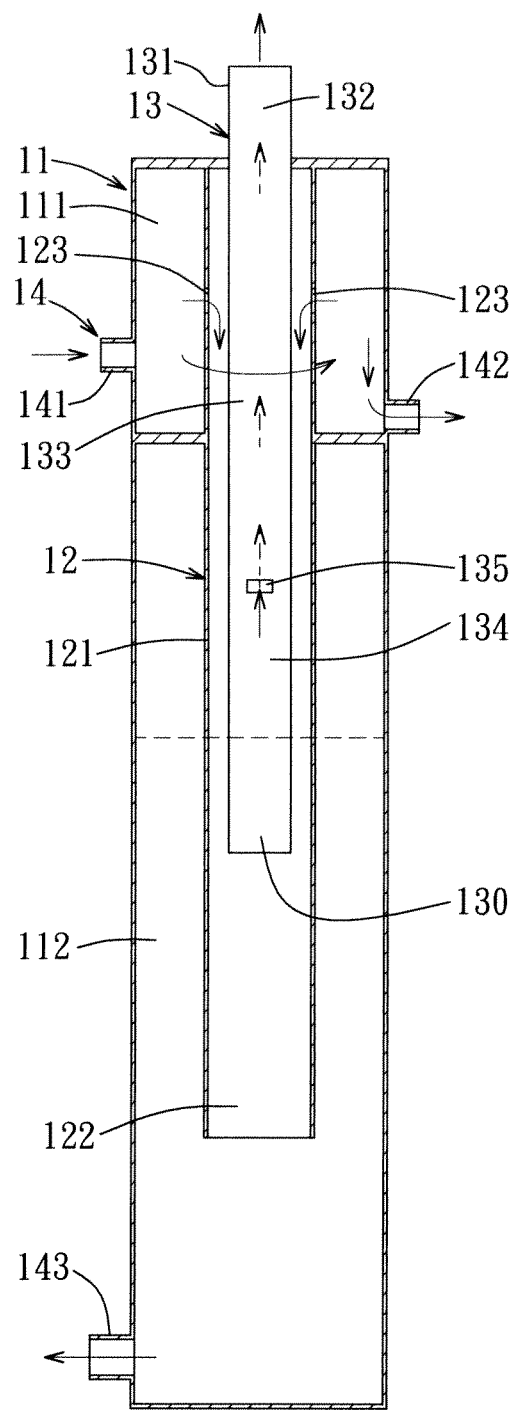
FIG. 1 is a sectional view of a conventional water purifier.
Figure 2:
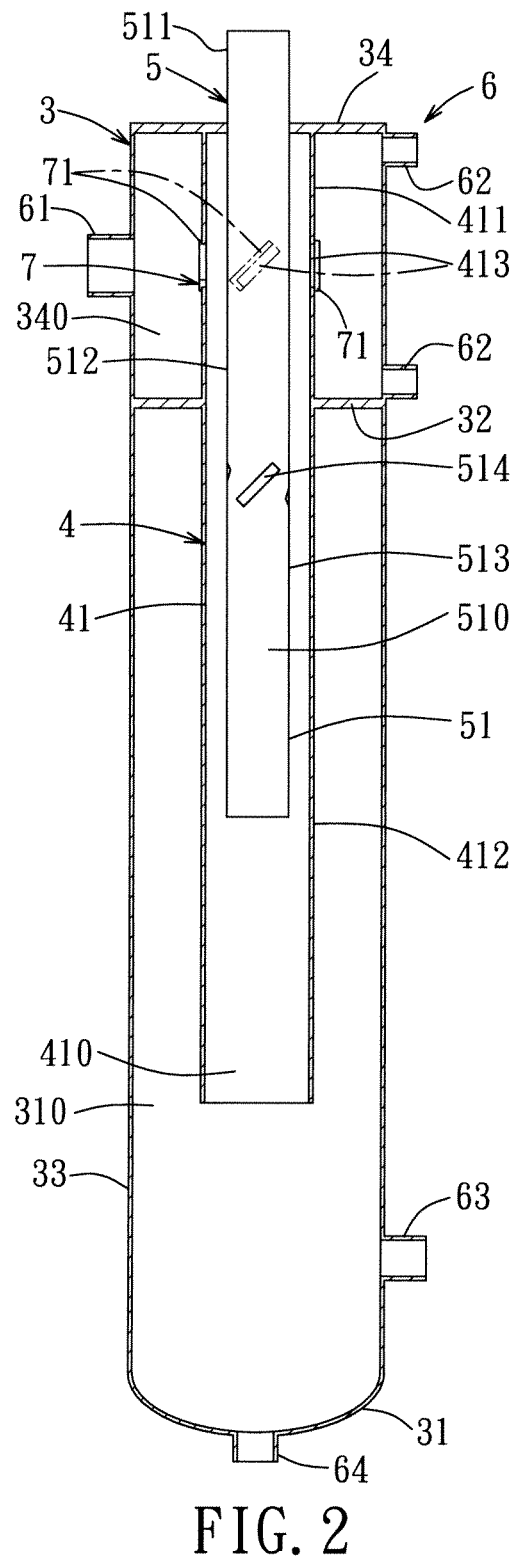
FIG. 2 is a sectional view of a water purifier according to the preferred embodiment of the present invention.
Figure 3:
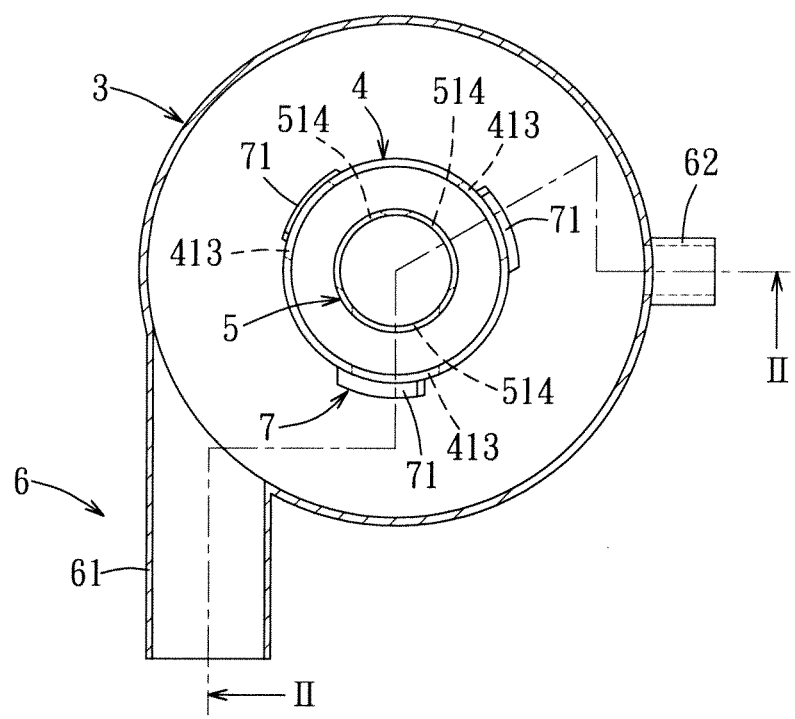
FIG. 3 is a sectional top view of the preferred embodiment.
Figure 4:
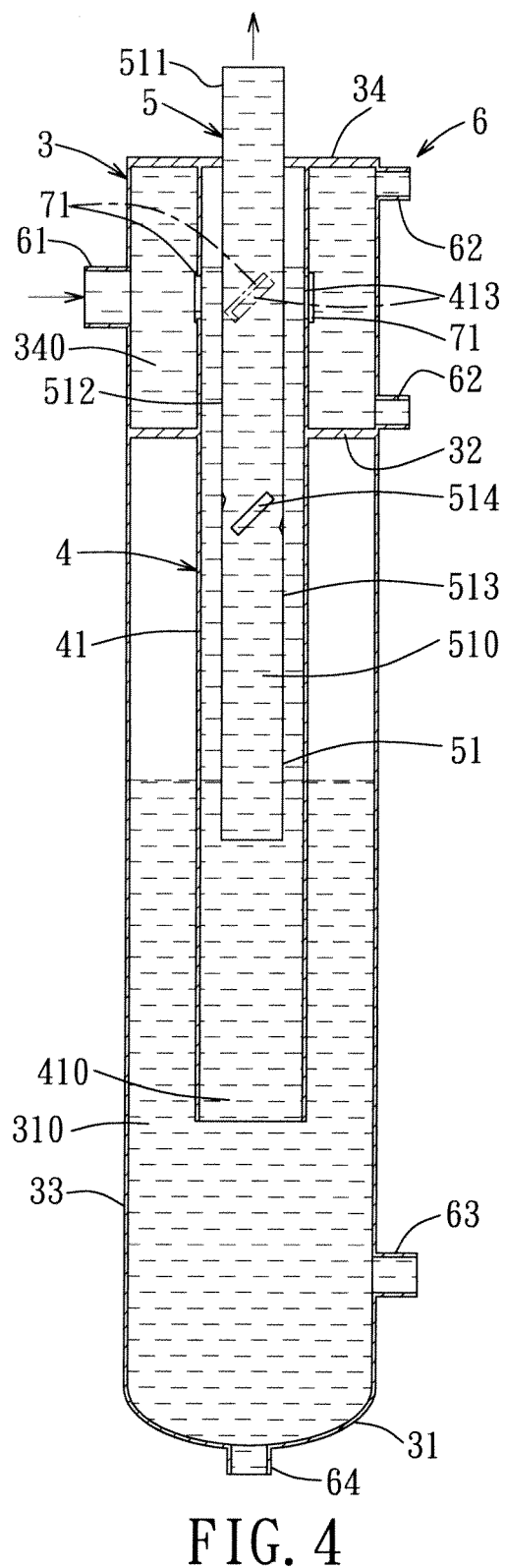
FIG. 4 illustrate liquid water circulating in the water purifier of the preferred embodiment.

Referring to FIGS. 2 to 4, a water purifier according to the preferred embodiment of the present invention is shown to comprise an outer tube 3, an intermediate tube 4, an inner tube 5, a water circulation unit 6 and a guide unit 7.

The outer tube 3 includes a bottom wall 31, an outer surrounding wall 33 extending upwardly from the bottom wall 31, a top wall 34 covering the outer surrounding wall 33, and a partition wall 32 connected to the outer surrounding wall 33 and disposed between the top and bottom walls 31, 34. The bottom wall 31, the outer surrounding wall 33 and the partition wall 32 cooperatively define a lower storage chamber 310. The top wall 34, the surrounding wall 33 and the partition wall 32 cooperatively define an upper storage chamber 340. In this embodiment, the bottom wall 31 is curved upwardly.

The intermediate tube 4 is disposed in the outer tube 3 and includes an intermediate surrounding wall 41 that extends downwardly from the top wall 34 of the outer tube and that defines a guide receiving space 410. The intermediate surrounding wall 41 includes a flow guide section 411 disposed in the upper storage chamber 340, and an extension section 412 disposed in the lower storage chamber 310. The flow guide section 411 has three angularly spaced-apart inclined through holes 413 to fluidly communicate the guide receiving space 410 and the upper storage chamber 340. Each of the inclined through holes 413 is inclined at an angle of 35° to 80° relative to a horizontal surface. Preferably, in this embodiment, each inclined through hole 413 is inclined at an angle of 45° relative to the horizontal surface.

The inner tube 5 is disposed in the intermediate tube 4 and includes an inner surrounding wall 51 that defines a water-exit passage 510. The inner surrounding wall 51 includes a water-exit section 511 extending through the top wall 34 of the outer tube 3, a liquid collecting section 513 disposed in the extension section 412 of the intermediate surrounding wall 4 without extending beyond the extension section 412, and a connecting section 512 connected between the water-exit section 511 and the liquid collecting section 513 and disposed in the flow guide section 411 of the intermediate surrounding wall 4. The liquid collecting section 513 has three angularly spaced-apart inclined guide holes 514 to fluidly communicate the guide receiving space 410 and the water-exit passage 510. Each of the inclined guide holes 514 is inclined at an angle of 35° to 80° relative to a horizontal surface. Preferably, in this embodiment, each inclined guide hole 514 is inclined at an angle of 45° relative to the horizontal surface.

The water circulation unit 6 includes a water inlet pipe 61 disposed on the outer surrounding wall 33 and communicating fluidly with the upper storage chamber 340, two upper water drain pipes 62 disposed on the outer surrounding wall 33 spaced apart from the water inlet pipe 61 and communicating fluidly with the upper storage chamber 340, a lower water drain pipe 63 disposed on the outer surrounding wall 33 and communicating fluidly with the lower storage chamber 310, and a discharge pipe 64 disposed on the bottom wall 31 of the outer tube 3 and communicating fluidly with the lower storage chamber 310. As shown in FIG. 3, viewing from a radial direction of the outer tube 3, a projection of the water inlet pipe 61 does not overlap with a projection of the intermediate tube 4. Simultaneously, viewing from an axial direction of the outer tube 3, a direction of water inflow into the water inlet pipe 61 is substantially perpendicular to a direction of water outflow from the upper water drain pipe 62. Further, a sum of cross sectional areas of the three inclined through holes 413 is smaller than a cross sectional area of the water inlet pipe 61, and a sum of cross sectional areas of the three inclined guide holes 514 is smaller than a cross sectional area of the intermediate tube 4.

With reference to FIGS. 2 and 3, the guide unit 7 includes a plurality of flow guide plates 71 disposed on the intermediate surrounding wall 41 at positions corresponding to the inclined through holes 413. Each of the flow guide plates 71 has a height that increases gradually, upwardly and inclinedly around the intermediate surrounding wall 41. It is worth mentioning that the sectional view of FIG. 2 is taken along line II-II of FIG. 3.

With reference to FIGS. 3 and 9, when using the water purifier of this invention, liquid water with large amount of sediments and suspended particles is introduced into the upper storage chamber 340 of the outer tube 3 through the water inlet pipe 61. Because the sum of the cross sectional areas of the three inclined through holes 413 in the intermediate tube 4 is smaller than the cross sectional area of the water inlet pipe 61, the amount of water inflow is substantially greater than the amount of liquid water flowing through the inclined through holes 413 so that the liquid water can be accumulated in the upper storage chamber 340. Further, because the projections of water inlet pipe 61 and the intermediate tube 4 do not overlap, the liquid water introduced into the upper storage chamber 340 forms a swirling motion about the intermediate tube 4. During swirling, large particle size sediments are thrown against the outer surrounding wall 33 by centrifugal force and are discharged through the upper water drain pipes 62. It is worth mentioning that, in this embodiment, one of the upper water drain pipes 62 is disposed in proximity to the partition wall 32 so that sediments at a bottom portion of the upper storage chamber 340 can be discharged therefrom, and the other one of the upper water drain pipes 62 is disposed in proximity to the top wall 34 so that suspended particles at a top portion of the upper storage chamber 340 can be discharged therefrom.

Moreover, the flow guide plates 71 of the guide unit 7 are used to create a turbulence and to guide the liquid water that is close to the intermediate tube 4 to flow through the inclined through holes 413. Water flow that is distal from the water inlet pipe 61 has less kinetic energy as compared to that which is proximal to the water inlet pipe 61. Hence, a better flow guide can be affected with taller flow guide plates.

From the aforesaid description, the liquid water that is cleaner and that is located in an inner side of the upper storage chamber 340 enters the guide receiving space 410 of the intermediate tube 4 via the inclined through holes 413, and from the guide receiving space 410 down into the lower storage chamber 310. Simultaneously, because the inclined through holes 413 are inclined at an angle of 45° relative to the horizontal surface, the liquid water entering the inclined through holes 413 will not affect the swirling motion thereof.

When the cleaner liquid water flows into the lower storage chamber 310, a portion thereof that is close to the inner tube 5 enters the water-exit passage 510 through the inclined guide holes 514 and discharges upwardly through the inner tube 5. Because the sum of the cross sectional areas of the three inclined guide holes 514 is smaller than the cross sectional area of the intermediate tube 4, the amount of the remaining portion of the liquid water that flows to the lower storage chamber 310 is greater than that of the discharged portion, so that the liquid water can be gradually accumulated in the lower storage chamber 310. Because sediments precipitating in the bottom wall 31 of the outer tube 3 can be discharged through the discharge pipe 64, and suspended particles that are close to the outer surrounding wall 33 can be discharged through the lower water drain pipe 63, liquid water accumulated at a middle section of the lower storage chamber 310 is more purified. As the liquid water is accumulated in the lower storage chamber 310 to a height that covers an opening in the guide receiving space 410, the lower storage chamber 310 becomes airtight. Compressed air inside the lower storage chamber 310 forces the liquid water to flow through the water-exit passage 510 and move upwardly along the liquid collecting section 513 and the connecting section 512, and out of the water-exit section 511 of the inner tube 5. Hence, purified liquid water can be collected therefrom. In this embodiment, approximately 45% of the liquid water in the intermediate tube 4 directly enters the inner tube 5 through the inclined guide holes 514, while approximately 55% of the liquid water is forced into the inner tube 5 by compressed air.

In summary, the water purifier of the present invention has the inclined through holes 413 in the intermediate tube 4 inclined at an angle of 45° relative to the horizontal surface, so that the liquid water can flow continuously in a swirling motion about the intermediate tube 4 to centrifuge out the sediments and suspended particles, thereby enhancing the effect of water purification. Moreover, the flow guide plates 71 of the guide unit 7 can create a turbulence in the liquid water to guide the liquid water into the inclined through holes 413.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A water purifier comprising:
    an outer tube including a bottom wall, an outer surrounding wall extending upwardly from said bottom wall, a top wall covering said outer surrounding wall, and a partition wall connected to said outer surrounding wall and disposed between said top and bottom walls to divide said outer tube into a lower storage chamber and an upper storage chamber;
    an intermediate tube disposed in said outer tube and including an intermediate surrounding wall that extends downwardly from said top wall of said outer tube and that defines a guide receiving space, said intermediate surrounding wall including a flow guide section disposed in said upper storage chamber, and an extension section disposed in said lower storage chamber, said flow guide section having a plurality of angularly spaced-apart inclined through holes to fluidly communicate said guide receiving space and said upper storage chamber;
    an inner tube disposed in said intermediate tube and including an inner surrounding wall that defines a water-exit passage, said inner surrounding wall including a water-exit section extending through said top wall of said outer tube, a liquid collecting section disposed in said extension section of said intermediate surrounding wall without extending beyond said extension section, and a connecting section connected between said water-exit section and said liquid collecting section and disposed in said flow guide section of said intermediate surrounding wall, said liquid collecting section having a plurality of angularly spaced-apart inclined guide holes to fluidly communicate said guide receiving space and said water-exit passage;
    a water circulation unit including a water inlet pipe disposed on said outer surrounding wall and communicating fluidly with said upper storage chamber, at least one upper water drain pipe disposed on said outer surrounding wall spaced apart from said water inlet pipe and communicating fluidly with said upper storage chamber, and at least one lower water drain pipe disposed on said outer surrounding wall and communicating fluidly with said lower storage chamber; and
    a guide unit including a plurality of flow guide plates disposed on said intermediate surrounding wall at positions corresponding to said inclined through holes in said flow guide section.

2. The water purifier of claim 1, wherein each of said flow guide plates has a height that increases gradually, upwardly and inclinedly around said intermediate surrounding wall.

3. The water purifier of claim 1, wherein each of said inclined through holes in said intermediate surrounding wall is inclined at an angle of 35° to 80° relative to a horizontal surface.

4. The water purifier of claim 1, wherein each of said inclined guide holes in said inner surrounding wall is inclined at an angle of 35° to 80° relative to a horizontal surface.

5. The water purifier of claim 1, wherein a sum of cross sectional areas of said inclined through holes in said intermediate tube is smaller than a cross sectional area of said water inlet pipe.

6. The water purifier of claim 1, wherein a sum of cross sectional areas of said inclined guide holes in said inner tube is smaller than a cross sectional area of said intermediate tube.

7. The water purifier of claim 1, wherein a direction of water inflow into said water inlet pipe is substantially perpendicular to a direction of water outflow from said upper water drain pipe.

8. The water purifier of claim 1, wherein said water circulation unit includes two said upper water drain pipes, and further includes a discharge pipe disposed on said bottom wall of said outer tube and communicating fluidly with said lower storage chamber.

* * * * *